US012579507B2

(12) United States Patent
Ryan et al.

(10) Patent No.: US 12,579,507 B2
(45) **Date of Patent: \*Mar. 17, 2026**

(54) ROBOTIC SINGULATION SYSTEM WITH AUTOMATED ROUTING OF MANUALLY SCANNED PACKAGES

(71) Applicant: Dexterity, Inc., Redwood City, CA (US)

(72) Inventors: Timothy Ryan, San Francisco, CA (US); David Leo Tondreau, III, San Francisco, CA (US); Harsh Vardhan, Fremont, CA (US)

(73) Assignee: Dexterity, Inc., Redwood City, CA (US)

( \* ) Notice: Subject to any disclaimer, the term of this patent is extended or adjusted under 35 U.S.C. 154(b) by 215 days.

This patent is subject to a terminal disclaimer.

(21) Appl. No.: 18/125,031

(22) Filed: Mar. 22, 2023

(65) Prior Publication Data

US 2023/0306363 A1     Sep. 28, 2023

Related U.S. Application Data

(60) Provisional application No. 63/322,885, filed on Mar. 23, 2022.

(51) Int. Cl.
*G06Q 10/087* (2023.01)
*G06K 7/14* (2006.01)

(52) U.S. Cl.
CPC ......... *G06Q 10/087* (2013.01); *G06K 7/1413* (2013.01); *G06K 7/1417* (2013.01)

(58) Field of Classification Search
CPC .. G06Q 10/087; G06K 7/1413; G06K 7/1417; B07C 2501/0063; B07C 5/02;
(Continued)

(56) References Cited

U.S. PATENT DOCUMENTS

2006/0151604 A1\*   7/2006   Zhu ........................... G06K 7/14
                                                                  235/454
2023/0399136 A1\*  12/2023   Budu ..................... B25J 9/0084

FOREIGN PATENT DOCUMENTS

DE        102019131235        5/2021
WO         2021080678         4/2021

OTHER PUBLICATIONS

Tendolkar, Atharv et al. A DifferentialDrive Bot named Box-I-Bot with Intelligent Routing Infrastructure for remote inventory monitoring in warehouses. IEEE 2021. (Year: 2021).\*

\* cited by examiner

*Primary Examiner* — Fawaad Haider
(74) *Attorney, Agent, or Firm* — Van Pelt, Yi & James LLP

(57)     ABSTRACT

A robotic singulation system configured to enable automated routing of manually scanned packages is disclosed. In various embodiments, image data associated with a workspace in which at least a portion of a segmented conveyance structure is located is received at a processor via a communication interface. A visually-provided user input indicating a receptacle comprising the segmented conveyance structure is detected, based at least in part on the image data. A receptacle identifier associated with the receptacle indicated by the visually-provided user input is determined, in response to the visually-provided input and based at least in part on the image data. A scanned package information is associated with the receptacle identifier, at least in part in response to the visually-provided input.

16 Claims, 10 Drawing Sheets

(58) Field of Classification Search
CPC ............ B07C 5/36; G05B 2219/35444; G05B 2219/39102; G05B 2219/45047; G05B 19/4183; G05B 19/41895; B25J 9/1697
See application file for complete search history.

300

ROBOTIC SINGULATION SYSTEM WITH AUTOMATED ROUTING OF MANUALLY SCANNED PACKAGES

CROSS REFERENCE TO OTHER APPLICATIONS

This application claims priority to U.S. Provisional Patent Application No. 63/322,885 entitled ROBOTIC SINGULA-TION SYSTEM WITH AUTOMATED ROUTING OF MANUALLY SCANNED PACKAGES filed Mar. 23, 2022, which is incorporated herein by reference for all purposes.

BACKGROUND OF THE INVENTION

Singulation, sortation, and other parcel induction opera-tions, referred to herein collectively as "singulation", typi-cally involves picking packages or other items from a source chute, bin, conveyor, or other source receptacle and placing them singly in a singulation/sortation destination, such as a single segment or tray in a segmented conveyor. Information typically must be determined to enable downstream han-dling of each item, such as by determining a destination and/or a class of service.

Robotic systems have been provided to automate the singulation process. In some systems, cameras or other optical sensors or scanners are used to read optical codes, such as bar codes and/or QR codes, and/or to read text information, such as by performing optical character recog-nition (OCR) to determine information printed in human-readable form, e.g., text and/or numbers, on an item, such as a shipping label.

In some cases, optical codes may be scanned at the sortation station, e.g., by cameras in fixed positions in the workspace and/or cameras on the robotic arm end effector. In some cases, a robotic arm may move a package through a "read zone" of a set of one or more scanners, e.g., as the package is moved from a pick area to a destination tray or bin to which it is to be placed.

In some cases, human workers cooperate with the robotic system to correct mistakes. For example, if two or more packages are placed in a single tray, a human may remove one of the packages and then place it in a later tray. However, errors may occur in automated singulation that a human worker may not be able to detect. For example, in a typical system there is no way for humans to determine which packages failed to scan when passing through the barcode reader or other scanner "read zone", because a package on the output conveyor that has had its barcode read success-fully may look the same as a package that failed to read as it passed through the barcode scanner or other scanner "read zone".

Packages that cannot be sorted through fully automated processing, e.g., optical code cannot be found or read, may be moved, e.g., automatically using the robotic arm, to a secondary, manual sortation station or flagged for manual scanning by a downstream worker. Human workers may manually scan packages from the secondary sortation sta-tion, or at a downstream workstation, and place them in a tray or other receptacle on a segmented conveyor or other singulation conveyance. The secondary sortation and/or manual scan work area typically has limited capacity com-pared to the main sorter. If a human intervenes to manually scan a package and places it in or on a tray or other passing receptacle, in a typical system the system has no way to know which tray or other location the package has been placed in and therefore no way to associate the manually scanned information with the tray in which the package has been placed.

BRIEF DESCRIPTION OF THE DRAWINGS

Various embodiments of the invention are disclosed in the following detailed description and the accompanying draw-ings.

DETAILED DESCRIPTION

Figure 1A:
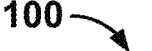
FIGS. 1A through 1H illustrate embodiments of a robotic singulation system with automated routing of manually scanned packages.
Figure 1A:
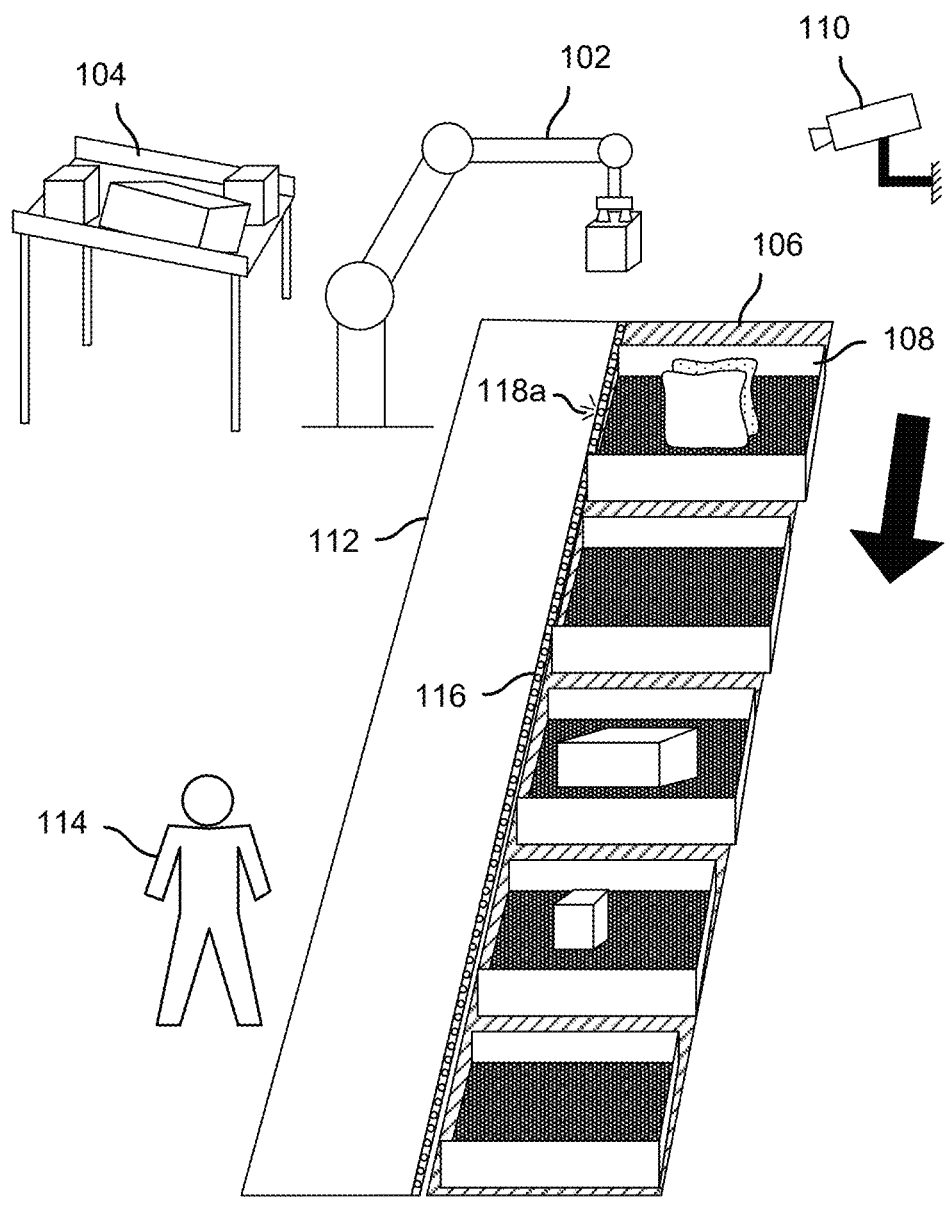

The invention can be implemented in numerous ways, including as a process; an apparatus; a system; a composi-tion of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as tech-niques. In general, the order of the steps of disclosed processes may be altered within the scope of the invention. Unless stated otherwise, a component such as a processor or a memory described as being configured to perform a task may be implemented as a general component that is tem-porarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying fig-ures that illustrate the principles of the invention. The invention is described in connection with such embodi-ments, but the invention is not limited to any embodiment. The scope of the invention is limited only by the claims and the invention encompasses numerous alternatives, modifi-cations and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to identify which tray, segment, or other singulation receptacle contains a package that has been manually scanned, e.g., by a human (or robotic) worker, and to associate the manually scanned information with the tray, segment, etc.

In various embodiments, a human (or robotic) worker scans a package manually, e.g., a package pulled from a secondary sortation bin or other receptacle. The worker places the scanned package on a tilt tray or other conveyor segment and provides an observable action (e.g., gesture) to indicate the tilt tray or other conveyor segment into which the manually scanned package has been placed.

In various embodiments, techniques disclosed herein are used to associate the package information scanned by the worker, e.g., routing information, with the tilt tray, segment, etc. in which the worker has placed the package. In some embodiments, a human (or robotic) worker scans a bar code or other code or label on the tilt tray, e.g., immediately following or shortly after scanning the package, and the system associates the package with the tray based on the adjacency and/or proximity in time of the scans. In some embodiments, a computer vision system processes camera feeds from a workspace and recognizes a worker at a given station is placing a package in a tray. In some embodiments, the system knows the unique identifier of the tray, e.g., based on its position within the workspace and/or on the segmented conveyor, and associated the manually scanned bar code with the tray identifier based on the image data used to detect that the worker has placed the item into the tray. In some embodiments, the system reads an optical code or other identifier of the tray, either shortly after the item has been placed in the tray or further downstream, and associates the manually scanned package information with that tray. In some embodiments, the system tracks the position of each tray as it is advanced by the segmented conveyor. The tray into which the manually scanned items has been placed may be tracked and based on its tracked position an optical code or other identifier and/or uniquely identifying trait of the tray may be read or determined at a downstream position of the tray, and at that time the information manually scanned on the package is associated with the tray identifier.

In some embodiments, the human worker provides a visible signal, such as a hand signal; holding up a paddle or other sign or marker; etc., that is recognized by a computer vision system as being associated with placement of a package by a human, and the system reads an optical code or other identifier of the tray and associates the package information from that worker's last scan, e.g., based on time and the station number with that tray.

The package is routed based on the manually scanned information and the tilt tray or other location into which the human worker placed the package.

FIGS. 1A through 1H illustrate embodiments of a robotic singulation system with automated routing of manually scanned packages. Referring first to FIG. 1A, in the example shown, system and environment 100 includes a robotic arm 102 positioned and configured to pick items from a chute, conveyor, or other source of items 104 and place them singly, each in a corresponding location on a segmented conveyor 106. Segmented conveyor 106 includes a sequence of tilt trays or other receptacles, such as tilt tray 108. Segmented conveyor 106 carries items placed in its tilt trays or other receptacles, e.g., 108, to downstream automated routing locations and structures. For example, trays containing packages address to destinations on the West Coast may be tilted as they pass a chute, conveyor, or other structure associated with destinations on the West Coast, causing a package in the tilted tray to be ejected onto or into the structure(s) associated with that set of destinations.

In the example shown in FIG. 1A, camera 110 is positioned in the workspace. Camera 110 may provide image data to a control computer configured to detect errors in automated sortation. For example, in the example shown, two items have been placed in the tray 108, instead of just one as intended. Such a condition may occur if, for example, two packages are struck together, e.g., by adhesive used to seal one or both of them, and one package sticks to the other as it is picked by robotic arm 102 from source of items 104 and placed in tray 108. The robotic arm 102 may move the items past a scanner or other label reader, but the label of only one would be read. In various embodiments, a control computer as disclosed herein may detect that two items have been placed in the single tray 108.

In another example, a robotic singulation system as disclosed herein may detect an item is too heavy to be singulated using robotic arm 102, not suitable to be singulated using robotic arm 102 for some other reason, e.g., due to bulk, materials, etc., or may have a damaged or obscured label. Such items may be diverted, using robotic arm 102 and/or other structures, for manual scanning and singulation, e.g., by a human worker.

In the example shown in FIG. 1A, a stationary side table 112 is provided adjacent to the segmented conveyor 106 to enable a downstream human (or other robotic) worker 114 to intervene to resolve errors, such as when two items are placed in a single tray 108. In this example, a strip 116 of LED lights (e.g., light 118a) are illuminated in sequence as a tray 108 having an issue requiring intervention by worker 114 is advanced by segmented conveyor 106, to indicate visually to the worker 114 that the tray (e.g., 108) requires intervention.

Figure 1B:
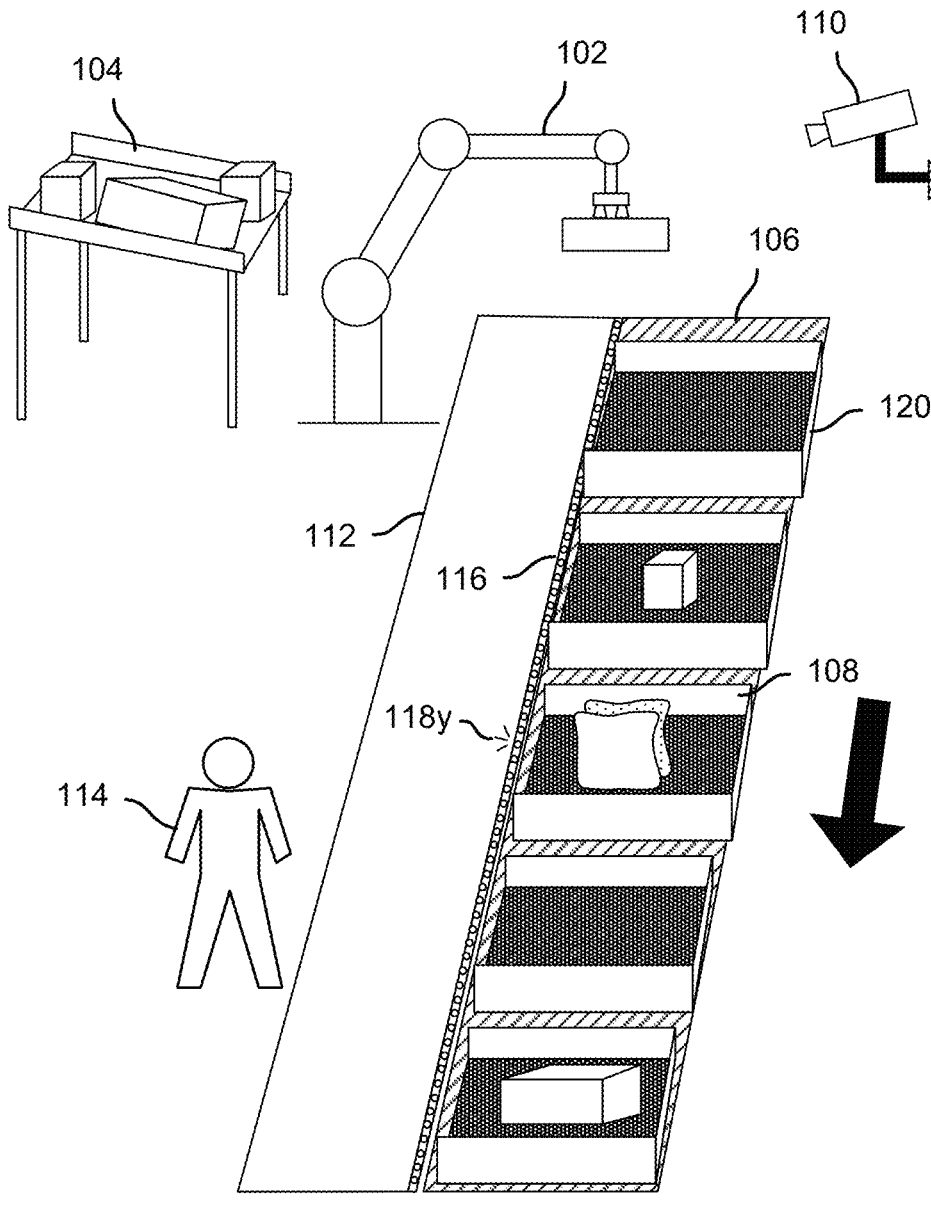
Figure 1C:
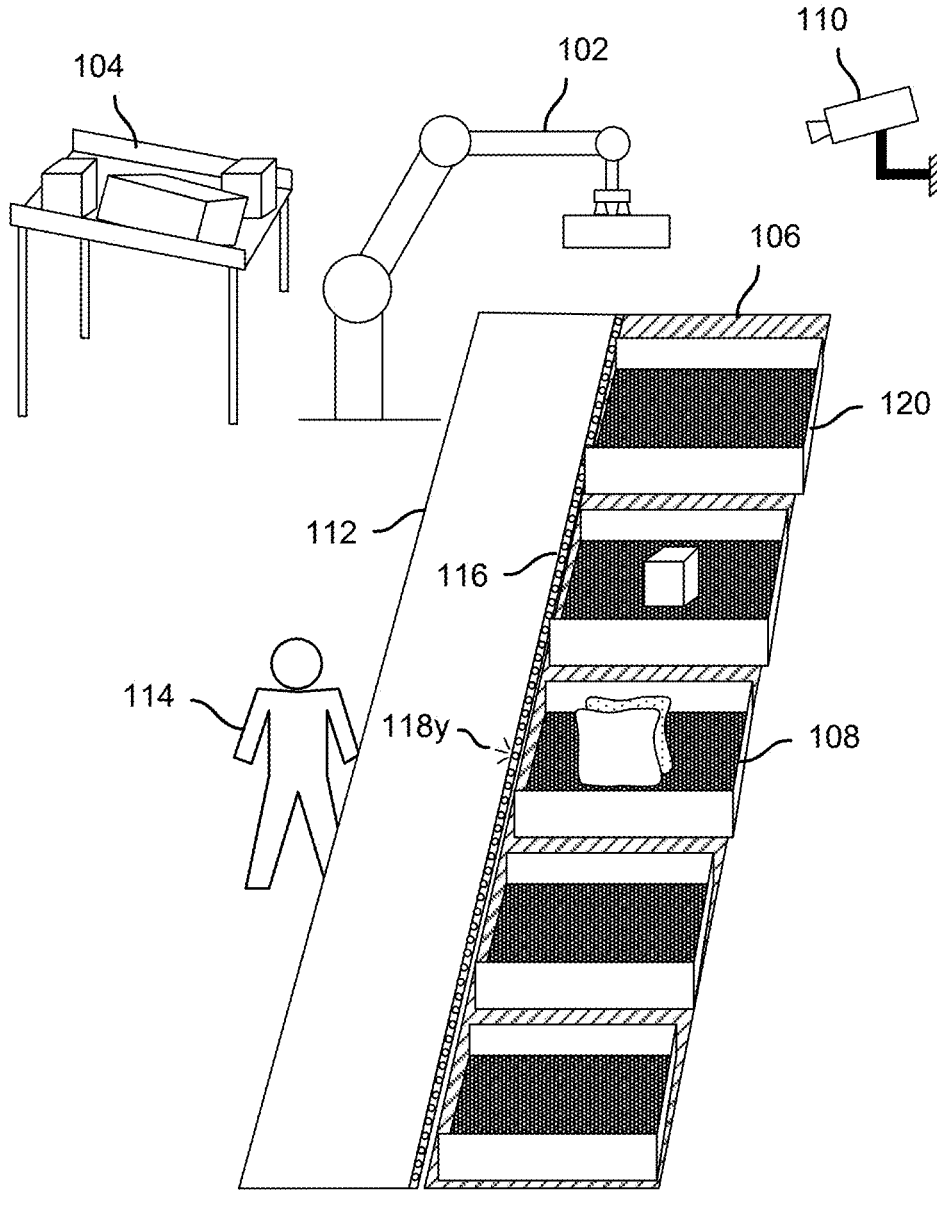
Figure 1D:
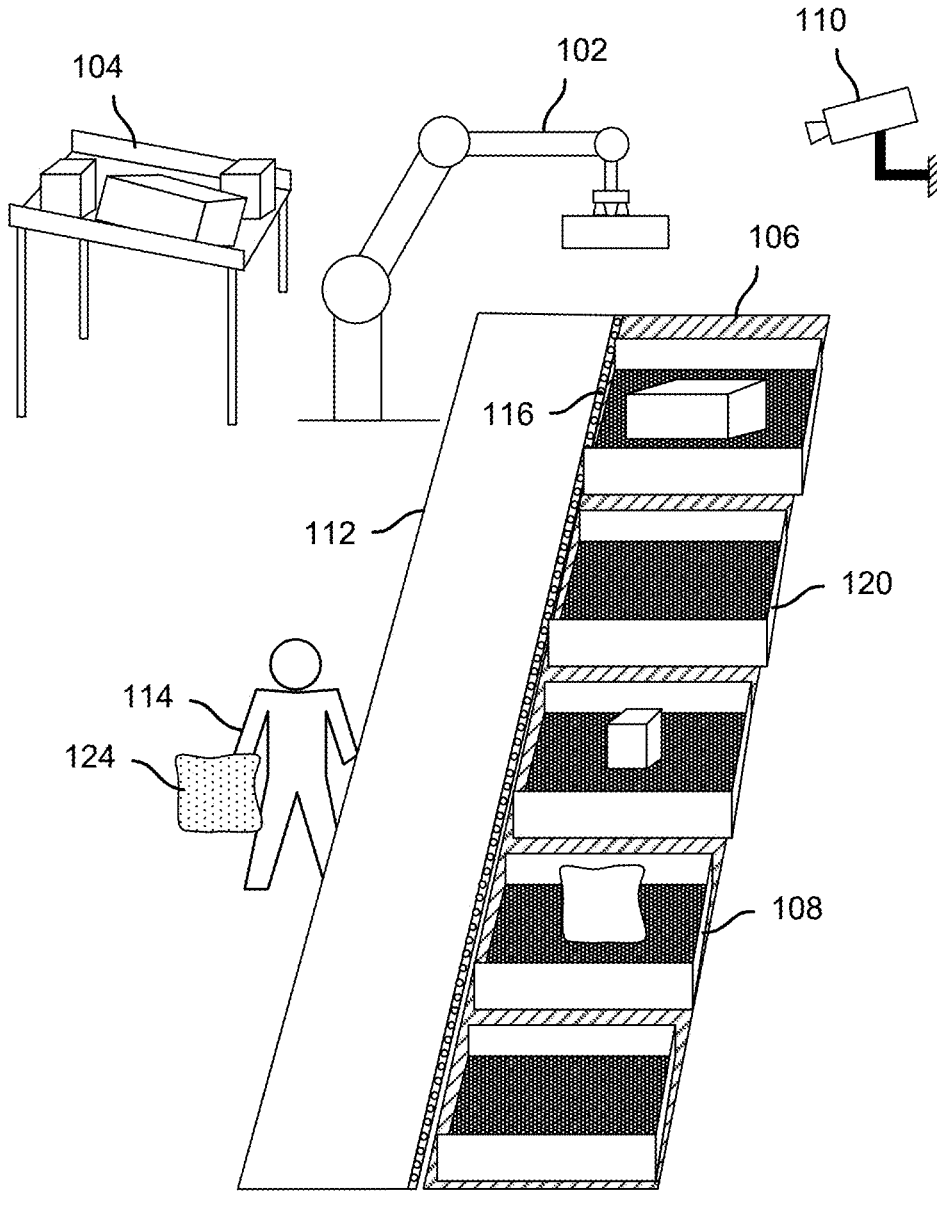

FIG. 1B shows tray 108 having been advanced to a location alongside LED 118y. A later tray 120 may intentionally be left empty by a control computer controlling robotic arm 102, to provide a location into which worker 114 can place a manually scanned package, such as the second, unscanned package from tray 108. FIG. 1C shows the worker 114 approaching table 112 to be able to pull one of the packages out of tray 108 for manual scanning and sortation, while FIG. 1D shows the worker 114 holding package 124 pulled from tray 108, leaving a single package in tray 108. In some embodiments, a downstream scanner, e.g., in the overhead, may scan or rescan the package in tray 108, to ensure correct routing. The worker 114 may be trained, for example, to ensure that the package left in tray 108 is laid flat with its address label on top, to facilitate downstream scanning or rescanning.

Figure 1E:
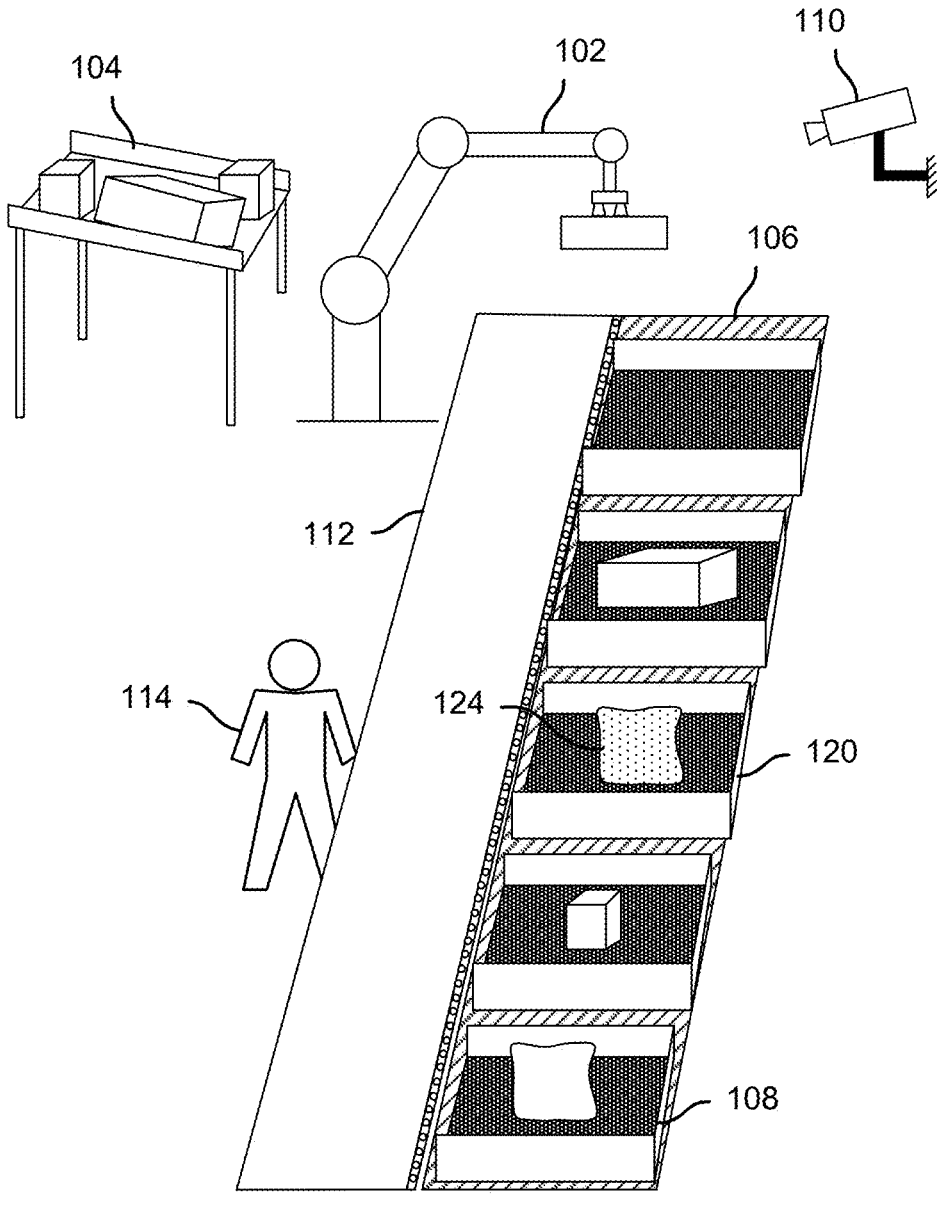

FIG. 1E shows item 124 after having been placed in tray 120 by worker 114. In some embodiments, worker 114 would have placed item 124 in tray 120 only after manually scanning a label on item 124. The scanned information would be held in a data structure until it is able to be associated with the tray 120, e.g., to facilitate downstream routing of item 124. In some embodiments, item 124 would be scanned or rescanned by a downstream scanner.

In various embodiments, a system as disclosed herein is configured to detect visual input provided by a human (or other robotic) worker after manual scanning, manual sortation, and/or manual resolution of an error, such as two items in one tray. In various embodiments, the system interprets the visual input as indicating a tray with which manually scanned information is associated. The system uses image data to determine a tray identifier for the tray into which the manually scanned (or singulated) item has been placed, and to associate manually scanned information (or information scanned by a downstream scanner) with the tray, to facilitate item routing based on the scanned information.

In various embodiments, a robotic singulation system as disclosed herein correlates package information scanned manually, e.g., by a human user, with information identifying a tilt tray, segment, or other singulation destinate in which the package has been placed after scanning.

For example, in various embodiments, the system correlates information scanned manually from a package with the tray information based on one or more of a manual scanning of an optical code or other information on or otherwise associated with the tray; with information manually keyed in by the human worker who scanned the package or by another worker; with information determined by a computer vision system based on camera images showing the human worker placing the manually-scanned package in the tray; etc.

In some embodiments, the human worker makes a hand gesture or holds up a paddle or other sign that the computer vision system is programmed and/or trained to recognize as indicating the human worker placed the package last scanned manually by the worker in a corresponding tray or other receptacle.

Downstream, the system uses the correlated information to further route the package via automated handling. For example, the tilt tray (or a pusher or other ejection mechanism) may be activated to eject the package as the tray passes a chute or other structure associated with delivery to a downstream destination to which the package is to be delivered, e.g., as indicated by information included and/or accessed (e.g., by look up) based on information scanned via the manual scan of the package.

Figure 1F:
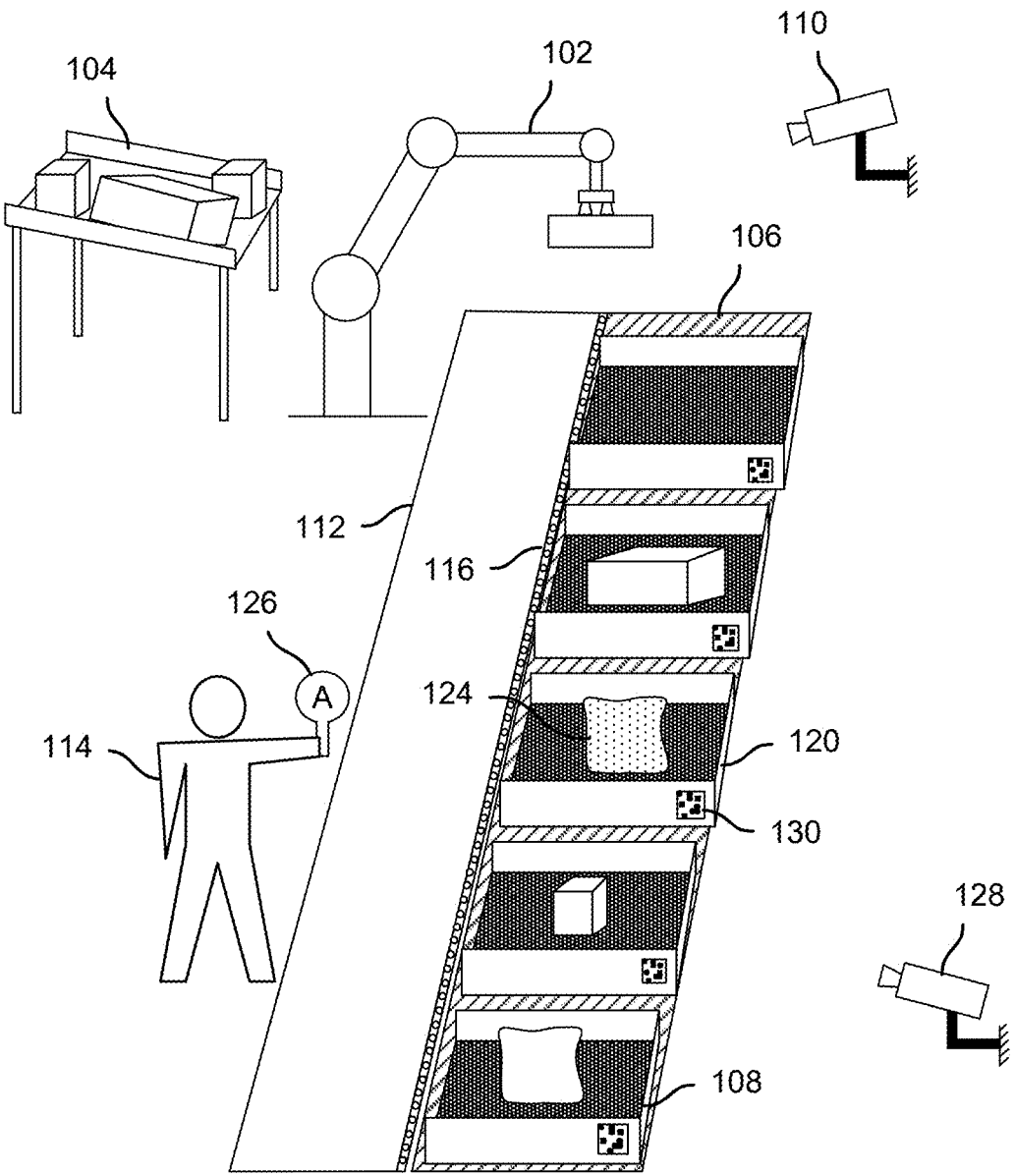

In FIG. 1F, for example, worker 114 holds up a paddle 126 bearing the identifier "A", shortly after having placed item 124 in tray 120. A system as disclosed herein, in various embodiments, uses image data, e.g., from camera 128 in this example, to read an optical code 130 on the side of the tray 120 into which worker 114 has placed item 124. The system uses the tray identifier determined by reading optical code 130 to associate routing information (e.g., destination, shipping service class, special handling requirements, etc.) scanned using a scanner associated with the worker 114 and/or paddle 126 (e.g., identifier "A") with the tray 120.

Figure 1G:
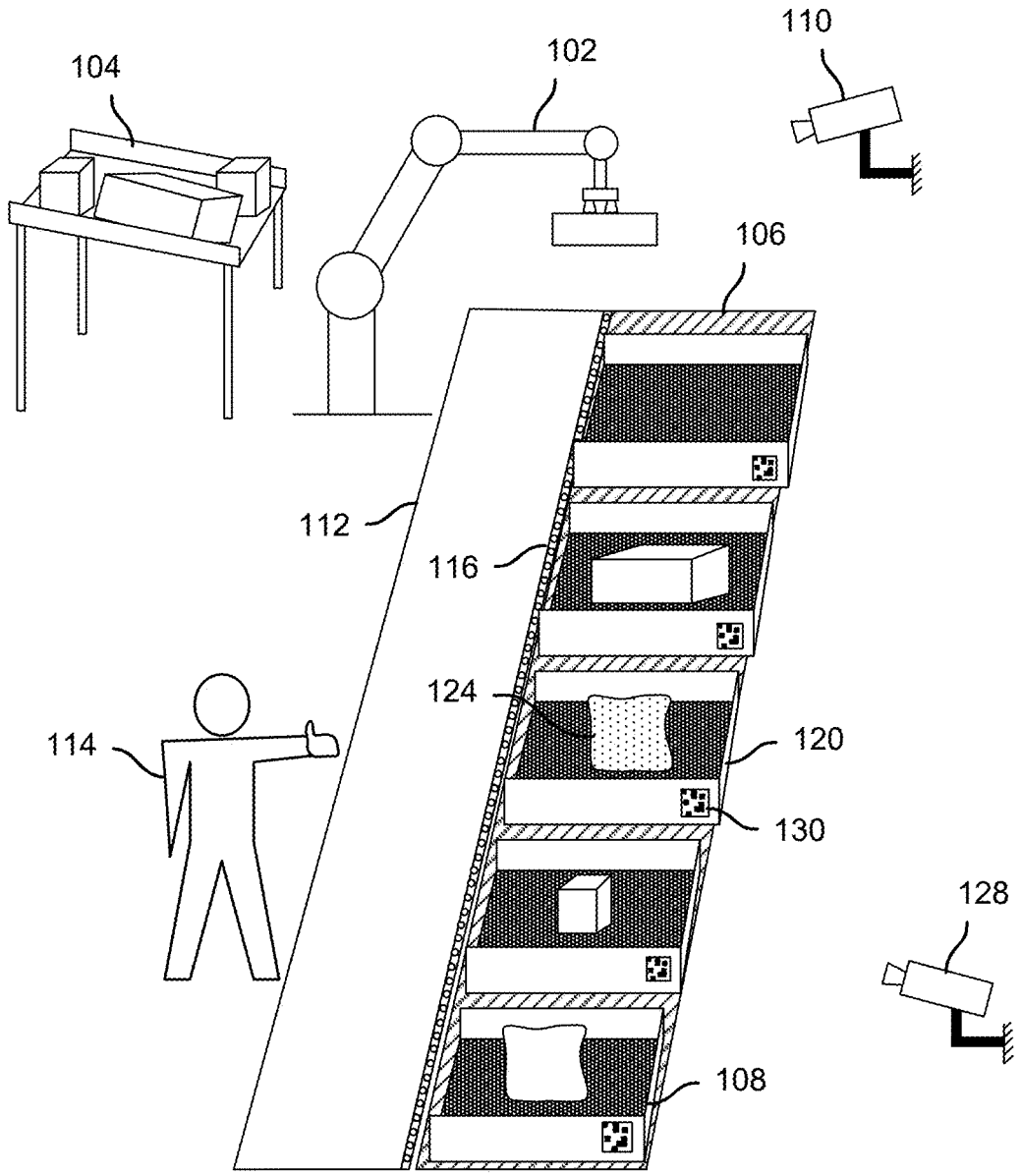

In the example shown in FIG. 1G, instead of a paddle 126 worker 114 makes a static hand gesture, in this example a "thumbs up" gesture, to indicate that manually scanned item 124 has been placed in tray 120. The system recognizes the "thumbs up" gesture and, in response, reads optical code 130 and uses information read from (or derived from) the code 130 to associate information manually scanned from item 124 with tray 120.

Figure 1H:
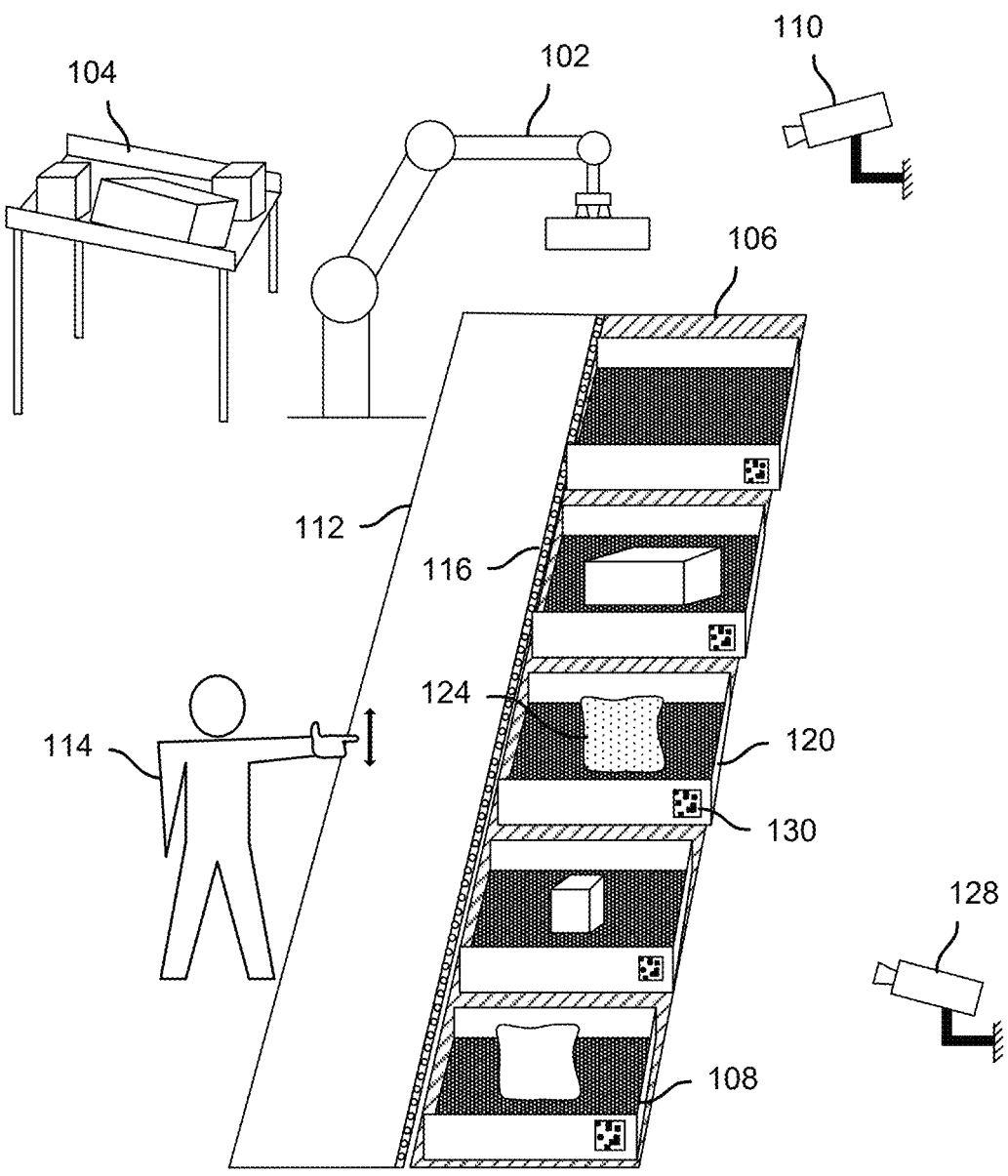

In the further example shown in FIG. 1H, worker 114 makes a dynamic hand gesture, in this example worker 114 moving their hand up and down while pointing at tray 120, to indicate that manually scanned item 124 has been placed in tray 120. The system recognizes the dynamic hand gesture and, in response, reads optical code 130 and uses information read from (or derived from) the code 130 to associate information manually scanned from item 124 with tray 120.

Figure 2:
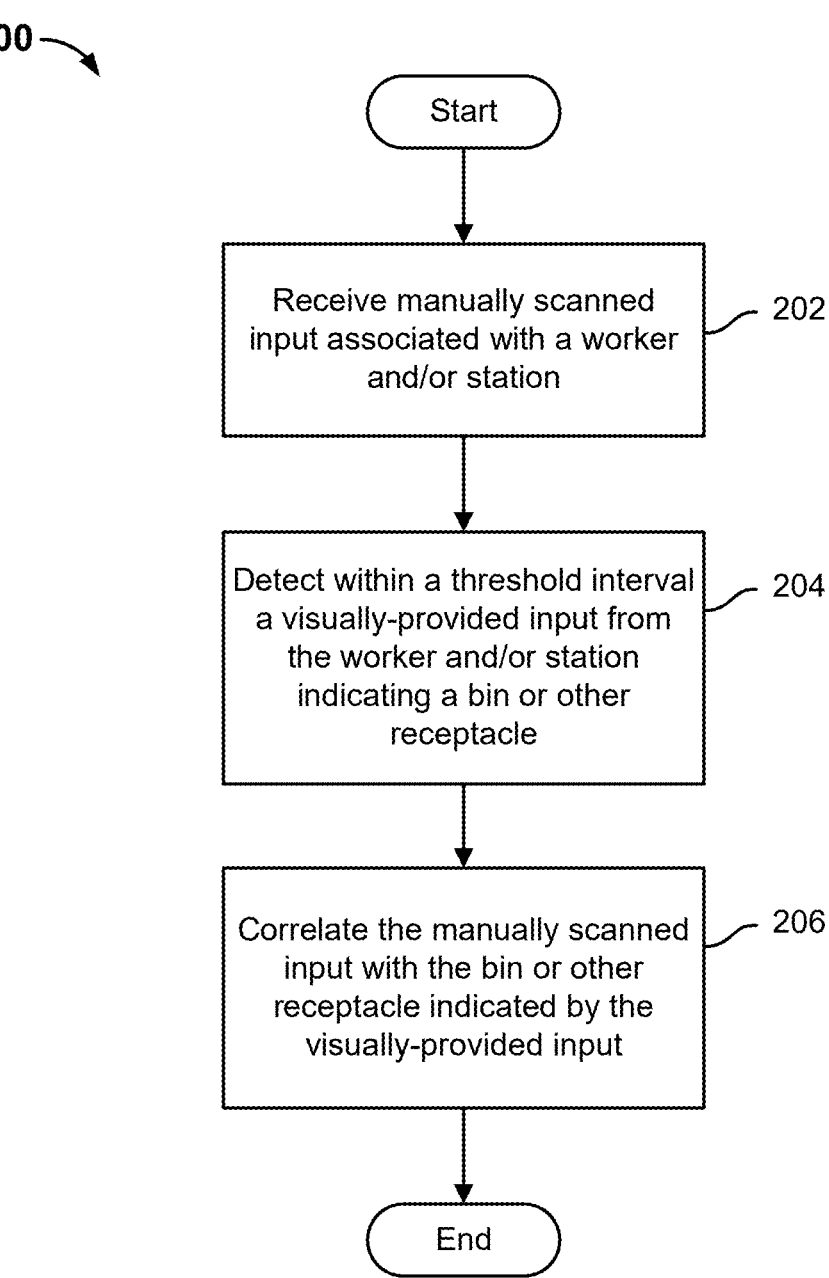
FIG. 2 is a flow diagram illustrating an embodiment of an automated process to route manually scanned packages.

FIG. 2 is a flow diagram illustrating an embodiment of an automated process to route manually scanned packages. In various embodiments, the process 200 of FIG. 2 is implemented by a control computer comprising a robotic singulation system with automated routing of manually scanned packages. In the example shown, at 202 manually scanned information associated with a worker and/or station is received. At 204, within a threshold time of receiving the information at 202, a visually-provided input associated with the same worker/station is detected. In some embodiments, a visually-provided input received more than a threshold time after a manual scan, e.g., 20 seconds in some embodiments and/or some other, e.g., configurable, interval, is disregarded, and the manually scanned information is discarded. In some embodiments, failure or inability to associated manually scanned information with the corresponding tray into which the manually scanned item has been place results in the item and associated tray being subjected to exception handling downstream, such as by returning the item to the manual scan station or another ingestion point.

In various embodiments, an input provided by a worker via a visible action indicates a bin or other receptacle, e.g., a tray on a segmented conveyor. For example, the paddle of FIG. 1F or the hand gestures of FIG. 1G or FIG. 1H may be detected. At 206, the manually scanned information received at 202 is associated with the bin or other receptacle indicated at 204. For example, an optical code or alphanumeric identifier may be read from the bin or other receptacle, e.g., optical code 130 in the examples shown in FIGS. 1F, 1G, and 1H, to determine an identifier associated with the bin or other receptacle, and the manually scanned information may be associated with the bin/receptacle identifier.

In various embodiments, the manually scanned information and data associating it with the bin/receptacle identifier may be used by the sortation system to route the item in the bin/receptacle, such as by activating a tilt tray or other structures at an appropriate time and/or location to direct the item to structures associated with a destination to which the item is addressed.

Figure 3:
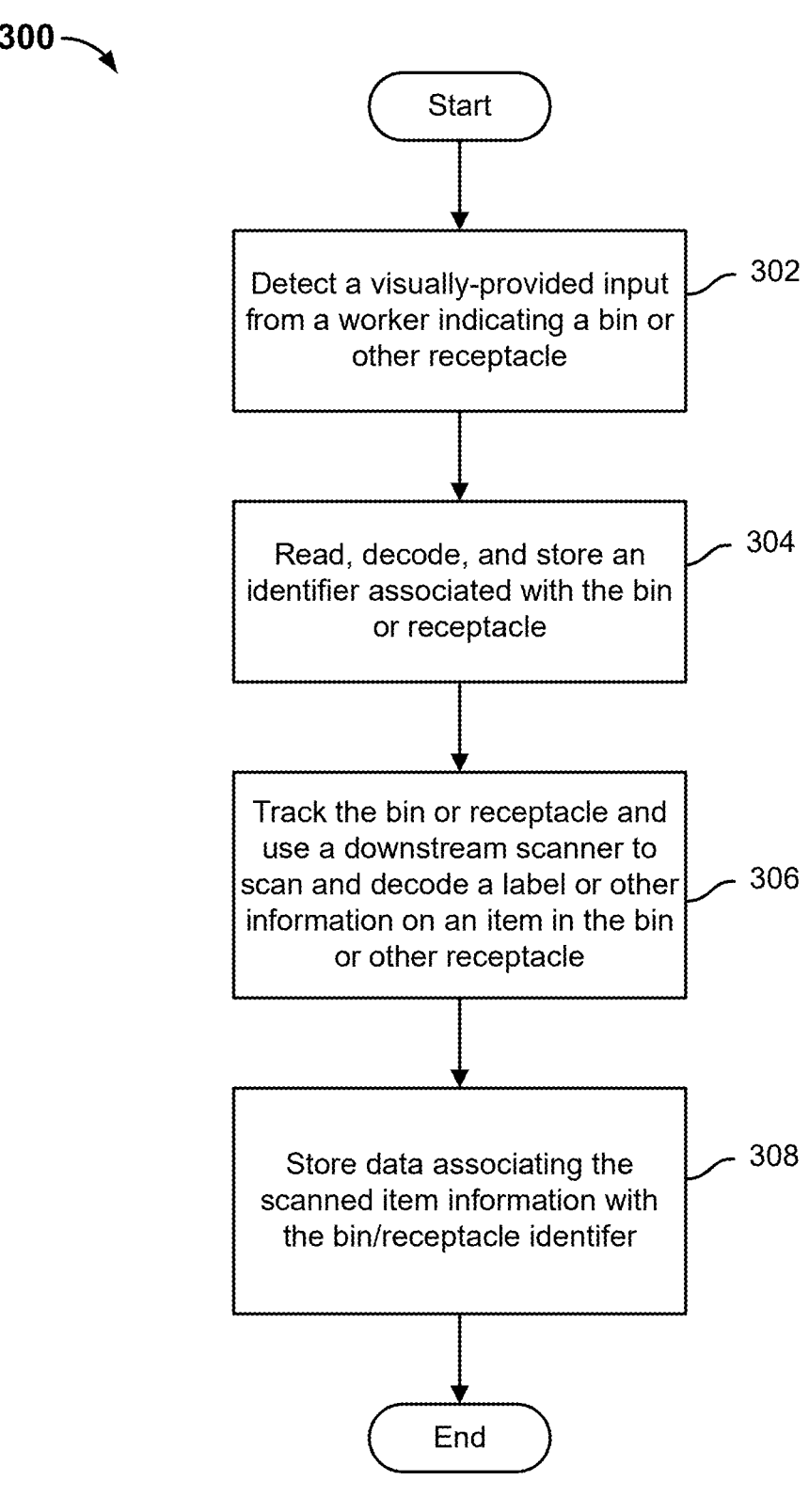
FIG. 3 is a flow diagram illustrating an embodiment of an automated process to route manually scanned packages.

FIG. 3 is a flow diagram illustrating an embodiment of an automated process to route manually scanned packages. In various embodiments, the process 300 of FIG. 3 is implemented by a control computer comprising a robotic singulation system with automated routing of manually scanned packages. In the example shown, at 302 a visually-provided input is detected, e.g., based on image data showing a human (or other) worker positioned downstream of a robotic sortation station, such as worker 114 in the examples shown in FIGS. 1A through 1H. In this example, the worker may not have performed a manual scan of an item. At 304, an optical code or other information is read from a bin/receptacle indicated by the visually-provided input, and an associated bin/receptacle identifier is determined and stored. For example, video frames or other images from moments preceding detection of the visually-provided input may be processed to determine a bin/receptacle into which the worker has just placed an item, or the visually-provided input may indicate the bin/receptacle into which the worker has just placed an item.

At 306, the bin/receptacle is tracked as it moves through the system, and a downstream (e.g., overhead or otherwise mounted) scanner is used to scan and decode a label or other information on a an item in the bin/receptacle. For example, the worker may have placed the item in the bin/receptacle with the label on top, to facilitate scanning. At 308, data associating the scanned information with the bin/receptacle identifier is stored.

In various embodiments, the scanned information and data associating it with the bin/receptacle identifier may be used by the sortation system to route the item in the bin/receptacle, such as by activating a tilt tray or other structures at an appropriate time and/or location to direct the item to structures associated with a destination to which the item is addressed.

In various embodiments, techniques disclosed herein may be used to provide automated routing of manually scanned packages, e.g., in the context of a robotic singulation system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a camera positioned in a workspace with a view of at least
        a part of a segmented conveyance structure, the segmented conveyance structure comprising a series of receptacles conveyed through the workspace via a belt or other conveyance mechanism;

a communication interface; and a processor coupled to the communication interface and configured to:

receive via the communication interface image data generated by the camera of a portion of the workspace through which successive receptacles comprising the segmented conveyance structure are conveyed;

detect, based at least in part on the image data, a visually-provided user input indicating a receptacle comprising the segmented conveyance structure, wherein the visually-provided user input is provided by a human worker positioned adjacent to the segmented conveyance structure downstream from a robotic singulation station comprising a robotic arm configured to place packages singly each on a corresponding receptacle comprising the segmented conveyance structure;

determine, in response to the visually-provided input and based at least in part on the image data, a receptacle identifier associated with the receptacle indicated by the visually-provided user input; and associate a scanned package information with the receptacle identifier, at least in part in response to the visually-provided input;

wherein the receptacle comprises a first receptacle and the processor is further configured to detect that two items have been placed in a second receptacle by said robotic singulation station comprising the robotic arm; and, in response to detecting that two items have been placed in the second receptacle, leave a subsequent receptacle to remain empty as the subsequent receptacle passes the robotic singulation station.

2. The system of claim 1, wherein the visually-provided user input comprises information represented on or otherwise associated with a physical article depicted in the image data as being held by said human worker in the workspace.

3. The system of claim 1, wherein the visually-provided user input comprises a gesture depicted in the image data as being made by said human worker in the workspace.

4. The system of claim 3, wherein the visually-provided user input comprises a hand gesture in the image data as being made by said human worker in the workspace.

5. The system of claim 3, wherein the visually-provided user input comprises a dynamic gesture made by said human worker in the workspace.

6. The system of claim 1, wherein the scanned package information is manually scanned by a user with which the visually-provided user input is associated.

7. The system of claim 1, wherein the scanned package information is manually scanned by an equipment with which the visually-provided user input is associated.

8. The system of claim 1, wherein the processor is further configured to use a fixed scanner equipment to generate the scanned package information.

9. The system of claim 1, wherein the processor is further configured to use the receptacle identifier and the scanned package information to route a package associated with the receptacle comprising the segmented conveyance structure.

10. The system of claim 1, wherein the processor is configured to associate the scanned package information with the receptacle identifier based at least in part on a determination that the visually-provided user input was received within a threshold interval of the scanned package information being received.

11. The system of claim 1, wherein the processor is configured to determine the receptacle identifier at least in part by decoding an optical code displayed on or adjacent to the receptacle.

12. A method, comprising:

receiving at a processor via a communication interface image data associated with a workspace in which at least a portion of a segmented conveyance structure is located, wherein the image data is generated by a camera positioned in the workspace;

detecting, based at least in part on the image data, a visually-provided user input indicating a receptacle comprising the segmented conveyance structure, wherein the visually-provided user input is provided by a human worker positioned adjacent to the segmented conveyor downstream from a robotic singulation station comprising a robotic arm configured to place packages singly each on a corresponding receptacle comprising the segmented conveyance structure;

determining, in response to the visually-provided input and based at least in part on the image data, a receptacle identifier associated with the receptacle indicated by the visually-provided user input; and associating a scanned package information with the receptacle identifier, at least in part in response to the visually-provided input;

wherein the receptacle comprises a first receptacle and the processor is further configured to detect that two items have been placed in a second receptacle by said robotic singulation station comprising the robotic arm; and, in response to detecting that two items have been placed in the second receptacle, leave a subsequent receptacle to remain empty as the subsequent receptacle passes the robotic singulation station.

13. The method of claim 12, wherein the visually-provided user input comprises information represented on or otherwise associated with a physical article depicted in the image data as being held by said human worker in the workspace.

14. The method of claim 12, wherein the visually-provided user input comprises a gesture depicted in the image data as being made by said human worker in the workspace.

15. The method of claim 12, wherein the scanned package information is manually scanned by a user with which the visually-provided user input is associated.

16. A computer program product embodied in a non-transitory computer readable medium and comprising computer instructions for:

receiving at a processor via a communication interface image data associated with a workspace in which at least a portion of a segmented conveyance structure is located, wherein the image data is generated by a camera positioned in the workspace;

detecting, based at least in part on the image data, a visually-provided user input indicating a receptacle comprising the segmented conveyance structure, wherein the visually-provided user input is provided by a human worker positioned adjacent to the segmented conveyor downstream from a robotic singulation station comprising a robotic arm configured to place packages singly each on a corresponding receptacle comprising the segmented conveyance structure;

determining, in response to the visually-provided input and based at least in part on the image data, a receptacle identifier associated with the receptacle indicated by the visually-provided user input; and associating a scanned package information with the receptacle identifier, at least in part in response to the visually-provided input;

wherein the receptacle comprises a first receptacle and the processor is further configured to detect that two items have been placed in a second receptacle by said robotic singulation station comprising the robotic arm; and, in response to detecting that two items have been placed in the second receptacle, leave a subsequent receptacle to remain empty as the subsequent receptacle passes the robotic singulation station.

\*   \*   \*   \*   \*